US006793340B1

(12) United States Patent  
Morris et al.

(10) Patent No.: US 6,793,340 B1
(45) Date of Patent: Sep. 21, 2004

(54) PROGRESSIVE LENS

(75) Inventors: Michael Alan Morris, Santa Rosa, CA (US); Scott Warren Fisher, Flagstaff Hill (AU); Saulius Raymond Varnas, Brighton (AU); David Robert Pope, Rohnert Park, CA (US)

(73) Assignee: Sola International Holdings, Ltd., Lonsdale (AU)

( * ) Notice: Subject to any disclaimer, the term of this patent is extended or adjusted under 35 U.S.C. 154(b) by 0 days.

(21) Appl. No.: 10/089,781

(22) PCT Filed: Sep. 29, 2000

(86) PCT No.: PCT/AU00/01196

§ 371 (c)(1),
(2), (4) Date: Jun. 20, 2002

(87) PCT Pub. No.: WO01/25837

PCT Pub. Date: Apr. 12, 2001

(30) Foreign Application Priority Data

Oct. 1, 1999 (AU) ............................................. PQ3220
Oct. 5, 1999 (AU) ............................................. PQ3269

(51) Int. Cl.$^7$ ............................................... G02B 7/06
(52) U.S. Cl. ...................................... 351/169; 351/168
(58) Field of Search .............................. 351/168, 169, 351/170, 171, 172, 173, 174, 175, 176, 160 R, 161, 164

(56) References Cited

U.S. PATENT DOCUMENTS

| 2,878,721 | A | | 3/1959 | Kanolt |
| 4,240,719 | A | * | 12/1980 | Guilino et al. .............. 351/169 |
| 4,676,610 | A | | 6/1987 | Barkan et al. |
| 4,838,675 | A | | 6/1989 | Barkan et al. |
| 4,861,153 | A | | 8/1989 | Winthrop |
| 5,137,343 | A | | 8/1992 | Kelch et al. |

(List continued on next page.)

Primary Examiner—Georgia Epps
Assistant Examiner—Brandi Thomas
(74) Attorney, Agent, or Firm—Burns, Doane, Swecker & Mathis, LLP

(57) ABSTRACT

A progressive ophthalmic lens including a far vision zone, a near vision zone and an intermediate vision zone is provided having a relatively high, relatively wide near vision zone and a relatively wide intermediate zone. A surface correction(s) for reducing optical aberrations in peripheral regions of the lens may be provided within a pair of generally horizontally disposed opposed segments approximately ±22.5° above and below a generally horizontally axis passing through a fitting cross. Two or more progress ophthalmic lenses differing in prescribed addition power may be placed in series to provide a range of distance prescriptions for one or more of emmetropes, hyperopes and myopes. A method of designing the progressive ophthalmic lens is also disclosed.

31 Claims, 12 Drawing Sheets

U.S. PATENT DOCUMENTS

| | | | |
|---|---|---|---|
| 5,444,503 A | 8/1995 | Kelch et al. | |
| 5,488,442 A | 1/1996 | Harsigny et al. | |
| 5,530,491 A | * 6/1996 | Baude et al. | 351/169 |
| 5,708,492 A | 1/1998 | Kitani | |
| 5,708,493 A | 1/1998 | Ahsbahs et al. | |
| 5,710,615 A | 1/1998 | Kitani | |
| 5,719,658 A | 2/1998 | Ahsbahs et al. | |
| 5,771,089 A | 6/1998 | Barth | |
| 5,805,260 A | 9/1998 | Roffman et al. | |
| 5,805,265 A | * 9/1998 | Umeda | 351/169 |
| 5,812,238 A | * 9/1998 | Ahsbahs et al. | 351/169 |
| 5,861,935 A | 1/1999 | Morris et al. | |
| 5,864,380 A | 1/1999 | Umeda | |
| 5,867,246 A | 2/1999 | Edwards et al. | |
| 5,920,372 A | 7/1999 | Guilino et al. | |
| 5,949,519 A | 9/1999 | Le Saux et al. | |
| 6,019,470 A | 2/2000 | Mukaiyama et al. | |
| 6,074,062 A | 6/2000 | Morris et al. | |
| 6,086,203 A | 7/2000 | Blum et al. | |
| 6,102,544 A | 8/2000 | Baudart et al. | |
| 6,116,734 A | 9/2000 | Pedrono et al. | |
| 6,123,422 A | 9/2000 | Menezes et al. | |
| 6,142,624 A | 11/2000 | Morris et al. | |
| 6,142,627 A | 11/2000 | Winthrop | |
| 6,155,681 A | 12/2000 | Kris et al. | |
| 6,213,603 B1 | 4/2001 | Altheimer et al. | |
| 6,220,704 B1 | * 4/2001 | Mukaiyama et al. | 351/169 |
| 6,260,967 B1 | * 7/2001 | Edwards et al. | 351/169 |
| 6,309,067 B1 | 10/2001 | Zeidler | |
| 6,334,681 B1 | 1/2002 | Perrott et al. | |
| 6,343,861 B1 | 2/2002 | Kris et al. | |
| 6,364,481 B1 | 4/2002 | O'Connor et al. | |
| 6,454,408 B1 | 9/2002 | Morris et al. | |
| 6,505,930 B1 | 1/2003 | Perrott et al. | |
| 6,652,096 B1 | 11/2003 | Morris et al. | |

* cited by examiner

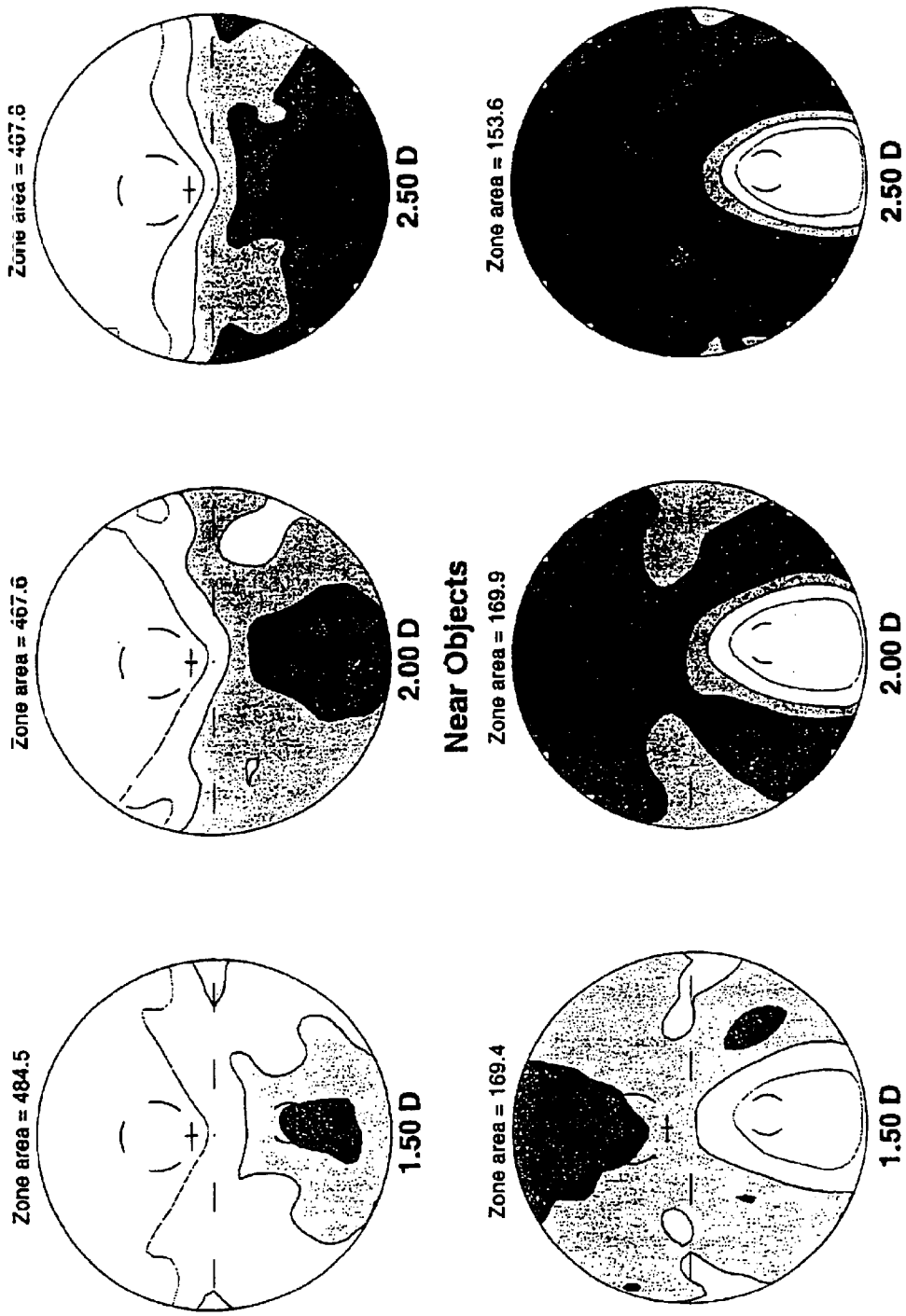

PROGRESSIVE LENS

The present invention relates to a progressive ophthalmic lens and in particular to a progressive ophthalmic lens exhibiting improved functionality and ease of adaptation, particularly for the first-time or part-time wearer, and taking into account wearer sensitivity to swim, and to a process for producing such lenses.

Numerous progressive lenses are known in the prior art. Progressive lenses have heretofore been designed on the basis that they have distance, near and intermediate viewing zones. The intermediate zone joins the near and distance zones in a cosmetically acceptable way, in the sense that no discontinuities in the lens should be visible to people observing the lens of the wearer The design of the intermediate zone is based on a line called the "eye path" along which the optical power of the lens increases more or less uniformly.

However, prior art progressive lenses present the wearer with significant adaptation difficulties. For example, a wearer who utilises progressive lenses for reading purposes may generally be inconvenient t)y the limited width of vision for near tasks. Similarly, new progressive spectacle wearers may be sensitive to swim and may be unable or unwilling to learn new head postures dictated by prior art progressive lenses.

It would be a significant advance in the art if the progressive lens could more closely relate to the requirements of the individual wearer and to the natural eye movements of a wearer in performing intermediate and near tasks in particular and thus make adaptation to a progressive prescription easier.

Accordingly, it is an object of the present invention to overcome, or at least alleviate, one or more of the difficulties and deficiencies related to the prior art. These and other objects and features of the present invention will be clear from the following disclosure.

Accordingly, in a first aspect of the present invention, there is provided a progressive ophthalmic lens element including a lens surface having an upper viewing zone having a surface power corresponding to distance vision, a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the lens surface including a relatively high, relatively wide lower viewing zone; and a relatively wide intermediate zone.

The present invention accordingly provides a progressive ophthalmic lens element exhibiting a balance in zone sizes which provides the wearer with significantly improved near and intermediate vision, thus making spectacles including the progressive ophthalmic lenses more acceptable to the first time or part-time wearer, or a wearer with a near vision priority, and making adaptation thereto a much simpler task.

We may estimate the size of she zone on the lens surface available for clear vision by ray tracing the lens in the as worn configuration for a specific object distance and calculating the area within an Add/4 diopter contour of the RMS power error inside a circle of the 22 m radius centred on the geometric centre (GC).

Preferably, the area of the lower viewing zone when ray traced to a 0.4 m object distance is over 150 mm$^2$.

In a further preferred aspect, the progressive lens design according to this aspect of the present invention may be such that the ratio of the area of clear vision of the upper (or distance) viewing zone to the lower (or near) viewing zone is in the range between approximately 2.50 and 3.00.

This clear vision size ratio is indicative of effective relative zone sizes and illustrates the improved balance of zone sizes between the distance and near viewing zones in the ophthalmic lens elements for wearers with a near vision priority according to the present invention.

By the term "Add" as used herein we mean surface addition power of the lens element.

In a further preferred aspect the progressive design lens according to this aspect of the present invention includes a surface design of the peripheral regions of the lens to reduce or minimise the phenomenon of "swim". By the term "swim" as used herein, we mean wearer perception of the unnatural movement of objects within the visual field during dynamic visual tasks, which may lead to a sense of unsteadiness, dizziness or nausea.

The applicants have found that the lens surface areas that are critical for reducing the swim sensation are within a pair of generally horizontally disposed opposed segments approximately ±22.5° above and below a generally horizontal axis passing through the fitting cross.

The opposed segments may have a radius of approximately 15 mm from the fitting cross, preferably approximately 20 mm, more preferably approximately 25 mm.

The minimisation of the swimming sensation may be achieved by reducing optical aberrations contributing to swim. A surface correction(s) may provide a reduction in the sagittal addition power within the opposed segments. The surface(s) may be such that the difference between maximum and minimum sagittal addition power is less than approximately 0.75*Add diopters. This may significantly reduce the phenomenon of swim for a wearer, in use.

This may have the result of increasing blur in the peripheral regions of the lower (or near) viewing zone. However, such blur increase in these regions is an acceptable trade-off in achieving wearer satisfaction with the progressive lenses.

In a still further preferred aspect of the present invention, the progressive lens design may exhibit a small amount of addition power (eg. 0.05 D to 0.4 D), proximate the fitting cross depending on the nominal addition power of the lens element and the base curve.

Applicants have found that the introduction of a small amount of addition power at the fitting cross aids the wearer in adapting to the progressive ophthalmic lens, particularly in respect of intermediate vision. The corridor of the intermediate viewing zone is thus effectively extended a small distance into the upper (or distance) viewing zone, allowing peripheral blur values to be reduced and the zone available for clear vision at intermediate distances to be increased.

It will be understood that the ophthalmic lens element according to the present invention may form one of a series of lens elements.

Accordingly, in a further aspect of the present invention, there is provided a series of progressive ophthalmic lens elements, each lens element including a lens surface having an upper viewing zone having a surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the progressive ophthalmic lens series including lens elements having a base curve suitable for use in providing a range of distance prescriptions for one or more of emmetropes, hyperopes and myopes, each lens element differing in prescribed addition power and including a progressive design including a relatively high, relatively wide lower viewing zone and a relatively wide intermediate zone; the dimensions of the intermediate and lower viewing zones being related to the prescribed addition power of the wearer.

The present invention accordingly relates to a progressive ophthalmic lens series exhibiting improved functionality and ease of adaptation, as it takes into account factors including one or more of the following: wearers' sensitivity to swim and natural eye movements. The progressive lens element within the series also exhibits a distance/near zone balance more appropriate for a part-time wearer or a wearer with a near vision priority than those provided by general purpose prior art progressive lenses.

As stated above, each progressive ophthalmic lens element in a series according to the present invention exhibits a relatively high lower viewing, or near vision, zone. The relatively high lower viewing zone may reduce the need for the wearer to learn new head postures for reading purposes.

Preferably the lens elements having a base curve suitable for emmetropes have an upper viewing zone and lower viewing zone such that the ratio of the area of clear vision of the upper viewing zone to the lower viewing zone is in the range between approximately 2.50 and 3.00.

In a preferred embodiment of this aspect of the present invention, each lens element in the series may have a progressive lens design exhibiting a small amount of addition power proximate the fitting cross; the addition power component proximate the fitting cross being related to the prescribed addition power and/or depth of focus of the wearer.

Preferably, the addition power proximate the fitting cross of a progressive lens element is in the range from 0.05 to 0.40 D, the fitting cross addition power increasing with the addition power for each of the base curves, and with the increasing base curve for each addition power.

The lens elements may exhibit an increase in corridor length within increasing addition power.

For example, for low to medium addition powers from approximately 1.0 D to 2.50 D, the relatively high, relatively wide lower viewing zone may permit useful reading from a point (the highest reading point) approximately 10 to 12 mm below the fitting cross. Thus the effective corridor length is approximately 10 to 12 mm.

For higher addition powers, eg. from approximately 2.50 D and above, the lower viewing zone may permit useful reading from a point (the highest reading point) approximately 12 mm below the fitting cross. Then the effective corridor length is approximately 12 mm. It will be understood that the slight increase in effective corridor length at higher addition powers permits an increased effective lower or near viewing zone size and/or lower peripheral blur.

By the term "highest reading point" we mean the highest point along the eye path where the wearer can read normal size text at the 40 cm reading distance without perceiving the blur. This is equal to the nominal prescribed add minus the effective depth of focus for near vision which is around 0.50 D for a broad range of addition powers.

In a further preferred embodiment of this aspect of the present invention, the progressive lens design of each lens element in this series includes a surface correction to reduce or minimise the phenomenon of "swim".

The surface modification to reduce swim may be provided within a pair of generally horizontally disposed opposed segments generally centred at the fitting cross of each ophthalmic lens element. The opposed segments may extend approximately ±22.5 ° above and below a generally horizontal axis passing through the fitting cross.

The opposed segments may have a radius of approximately 15 mm from the fitting cross, preferably approximately 20 mm, more preferably approximately 25 mm.

The swim surface correction(s) may be such as to reduce optical aberrations contributing to swim. The swim surface correction(s) may take the form of a reduction in the sagittal addition power variations within the segments defined above.

Preferably, the difference between maximum and minimum sagittal addition power within the opposed segments is less than approximately 0.75*Add (in diopters)

In a preferred embodiment of this aspect of the present invention, the progressive design of each lens element within the series exhibits a substantially constant ratio of the area of clear vision of the upper (or distance) viewing zone to the lower (or near) viewing zone for all addition powers. The clear vision zone size ratio may generally be in the range between approximately 2.50 and 3.00.

The generally constant clear vision zone size ratio may thus provide the wearer with a generally constant area for clear ioveal vision independent of addition power.

In a further preferred embodiment of this aspect of the present invention, the progressive lens design of each lens element within the series exhibits a substantially constant area of clear vision on the lens surface within the lower viewing zone for a specified base curve. Accordingly the design of each progressive lens element within the series provides the wearer with a generally constant, improved area of clear vision for near tasks across a range of addition powers.

Preferably, the lens element series according to claim 21, wherein the lens element series exhibits a slight decrease in the area of the zone clear for distance vision on the lens surface inside a 22 mm radius circle centred on the GC and constrained by the Add/4 diopters RMS power error contour ray traced in the as worn configuration for an infinite object distance with increasing base curve.

By the term "corridor", we mean an area of the intermediate zone of varying power bounded by nasal and temporal contours of tolerable aberration for foveal vision.

The corridor has a "corridor length" (L), which corresponds to the length of the segment of the visual fixation locus which extends from the vertical height of the fitting cross (FC) to the vertical height of the near zone measurement point. For example, in a typical lens element according to the present invention, the power progression begins at the fitting cross (FC) height.

By the term "effective corridor length" as used herein we mean the length from the "fitting cross" (FC) to the highest reading point (HRP) on the lens surface.

By the term "lens element", we mean all forms of individual refractive optical bodies employed in the ophthalmic arts, including, but not limited to, lenses, lens wafers and semi-finished lens blanks requiring further finishing to a particular patient's prescription. Also included are formers used in the manufacture of progressive glass lenses and moulds for the casting of progressive lenses in polymeric material such as the material sold under the trade designation CR39.

By the term "astigmatism or surface astigmatism", we mean a measure of the degree to which the curvature of the lens varies among intersecting planes which are normal to the surface of the lens at a point on the surface.

In a preferred embodiment of this aspect of the invention each lens element includes a surface correction to improve optical properties proximate the peripheries of the lens element. For example, the distribution of RMS power error may be varied proximate the peripheries of the upper (distance) and/or lower (near) viewing zones.

Preferably the distribution of RMS power error exhibits a relatively low gradient proximate the distance periphery and a relatively high gradient proximate the near periphery.

The relative values of these gradients can be quantified by examining the ratio of the maximum vertical rate of change of the ray traced RMS power error along the 12 mm long vertical lines centred on the fitting cross (FC) and horizontally offset 15 mm from the FC, to the maximum horizontal rate of change of the RMS power error at the level of the near vision measurement point (NMP). In a preferred form, this ratio may be less than approximately 0.60 and may preferably vary from approximately 0.40 to 0.60.

In a preferred aspect of the present invention, the location of the corridor of the ophthalmic lens element may be dictated at least in part by the visual fixation locus;

the visual fixation locus being inset generally horizontally nasally below the fitting cross (FC) of the lens element.

By the term "visual fixation locus", as used herein, we mean the set of points which are the intersection of the lens surface and the patient's line of sight as he or she fixates on objects in the median plane. The term does not signify a required, continuous eye movement path. Rather, the visual fixation locus indicates the set of points corresponding to variously positioned objects in the median plane.

As will be explained in detail below, the visual fixation locus takes into account the fact that the wearer may or may not use the accommodative reserve for a particular fixation. As a result, points at different locations in the visual fixation locus are provided having a power sufficient for comfortable use at the appropriate object distances.

The fitting cross (FC) is generally located at $(O, y_{FO})$. The value of $y_{FC}$ may vary, for example, from approximately 2 mm to 6 mm above the geometric centre of the lens element.

Mathematical Description of Lens Surface

In a still further aspect of the present invention, there, is provided a method of designing an ophthalmic lens element including a first lens surface having an upper viewing zone having a surface power corresponding to distance vision, a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism; the ophthalmic lens element including a relatively high, relatively wide lower viewing zone; and a relatively wide intermediate zone, which method includes selecting a merit function relating to at least one optical characteristic of the lens to be minimised with an appropriate distribution of the optimisation weights on the lens surface; and solving the global minimisation problem using the Finite Element Method; and fabricating an ophthalmic lens element having a lens surface shaped according to said optimised surface description.

The ophthalmic lens element may be formulated from any suitable material. A polymeric material may be used. The polymeric material may be of any suitable type. The polymeric material may include a thermoplastic or thermoset material. A material of the diallyl glycol carbonate type, for example CR-39 (FPG Industries) may be used.

The polymeric article may be formed from cross-linkable polymeric casting compositions, for example as described in Applicants' U.S. Pat. No. 4,912,155, U.S. patent application Ser. No. 07/781,392, Australian Patent Applications 50581/93, 50582/93, 81216/87, 74160/91 and European Patent Specification 453159 A2, the entire disclosures of which are incorporated herein by reference.

The polymeric material may include a dye, preferably a photochromic dye, which may, for example, be added to the monomer formulation used to produce the polymeric material.

The ophthalmic lens element according to the present invention may further include standard additional coatings to the front or back surface, including electrochromic coatings.

The front lens surface may include an anti-reflective (AR) coating, for example of the type described in U.S. Pat. No. 5,704,692 to Applicants, the entire disclosure of which is incorporated herein by reference.

The front lens surface may include an abrasion resistant coating, e.g. of the type described in U.S. Pat. No. 4,954,591 to Applicants, the entire disclosure of which is incorporated herein by reference.

The front and back surfaces may further include one or more additions conventionally used in casting compositions such as inhibitors, dyes including thermochromic and photochromic dyes, e.g. as described above, polarising agents, UV stabilisers and materials capable of modifying refractive index.

The present invention will now be more fully described with reference to the accompanying figures and examples. It should be understood, however, that the description following is illustrative only and should not be taken in any way as a restriction on the generality of the invention described above.

Figure 1:
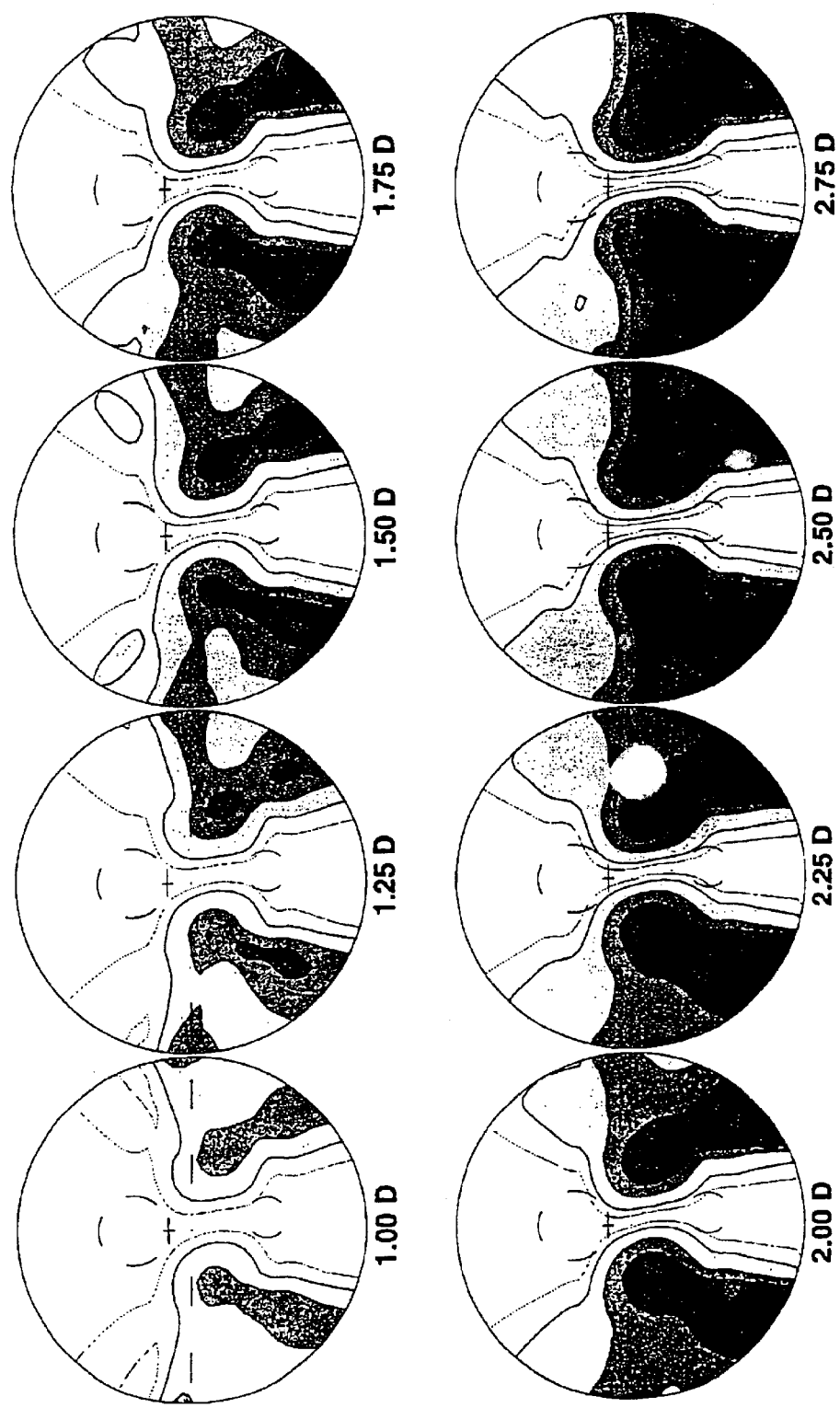
FIG. 1 illustrates contour plots of Surface Astigmatism of a series of optical lens elements according to the present invention, with a base curve of 5.00 D (intended for emmetropes) and having addition powers in the range of 1.00 D to 2.75 D.
Figure 2:
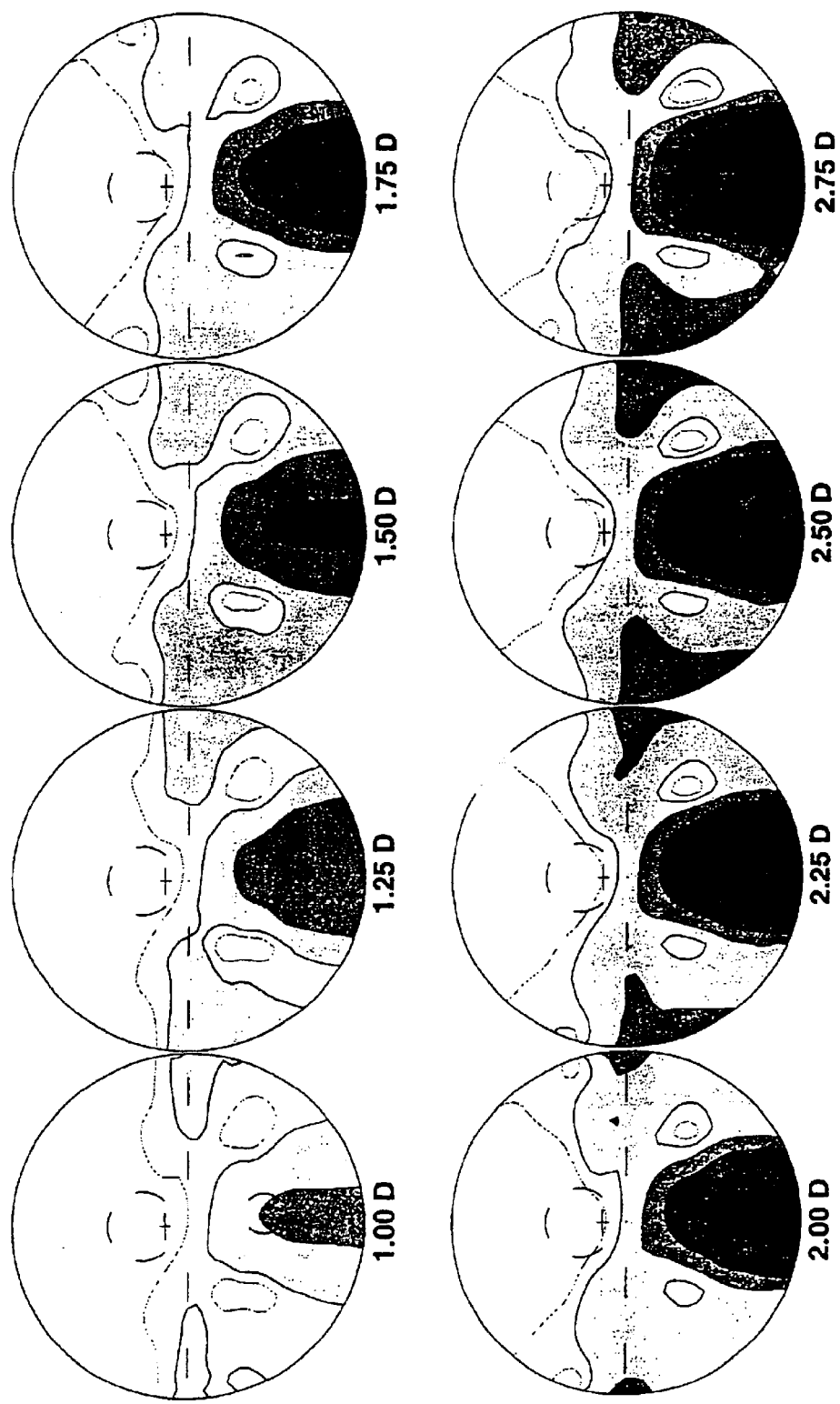
FIG. 2 illustrates contour plots of Surface Mean Power for the optical lens elements according to FIG. 1.
Figure 3:
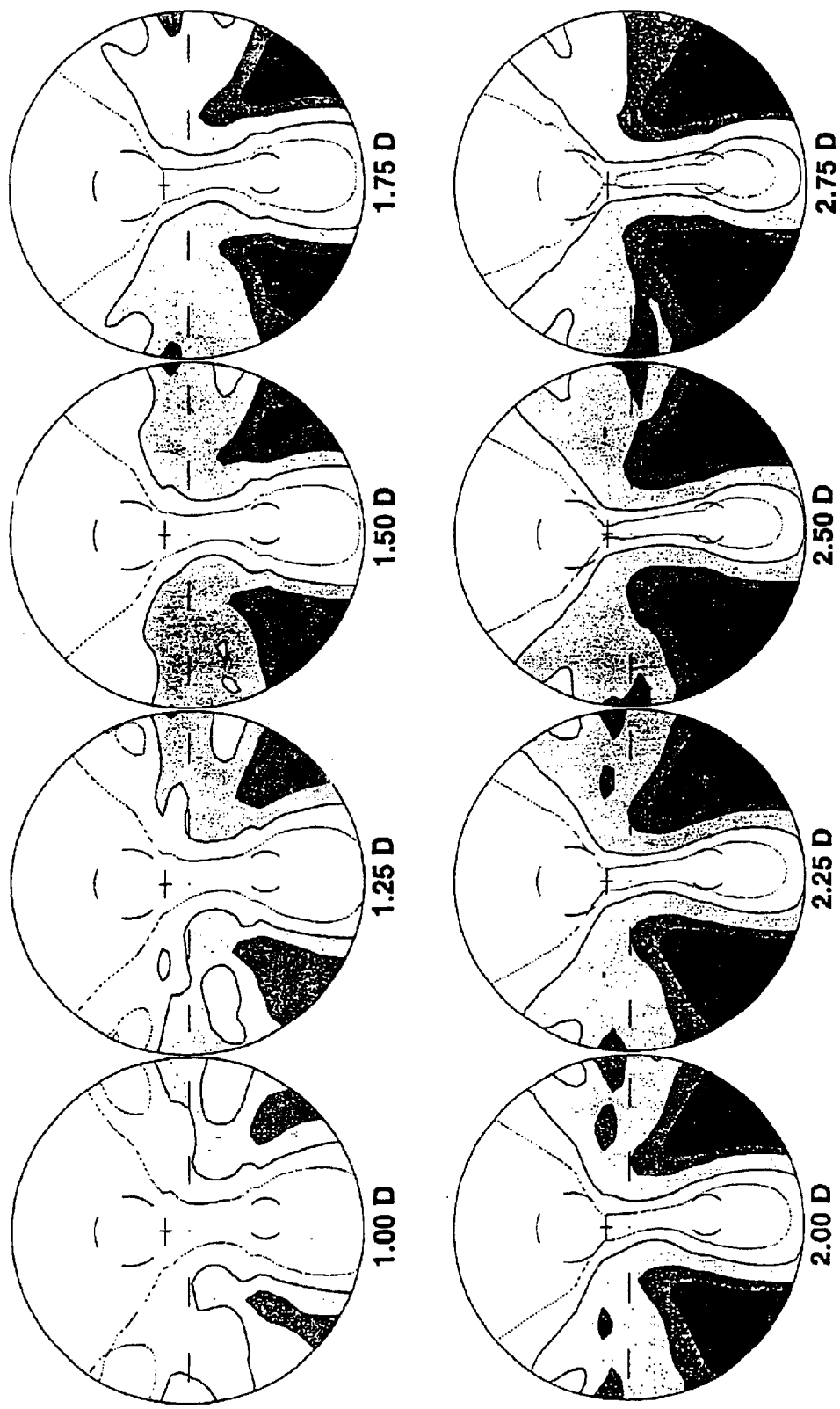

FIG. 3 illustrates contour plots of optical RMS Power Error of the optical lens elements according to FIGS. 1 and 2. Ray tracing has been carried out with the model lens in the material with refractive index of 1.537 having the front surface as shown in FIGS. 1 and 2 with the base curve of 5.00 D, a spherical back surface of 4.95 D, zero prism at the prism reference point and centre thickness of 2 mm; located in the front of the eye at a 27 mm back vertex distance from the centre of rotation of the eye and tilted pantoscopically by 7 degs. The assumed object field of the ray trace has a vertically varying distance starting at infinity (the dioptric distance of 0.00 D) for all rays crossing the front lens surface at elevations above the FC, through a linearly decreasing object distance below the FC up to the NMP, where the object distance was 0.4 m (2.5 D) for all adds up to 2.50 D, and staying constant along each ray at 0.4 m for elevations below the NMP. In the case of the 2.75 D add the near object distance was slightly shorter—0.36 m (2.75 D). In calculating the mean power error of the ray traced image as perceived by the wearer it has been assumed that the wearer has up to (2.5-Add) D of reserve accommodation enabling him/her to cancel the negative mean power errors up to that magnitude in the lower part of the lens.

Figure 4:
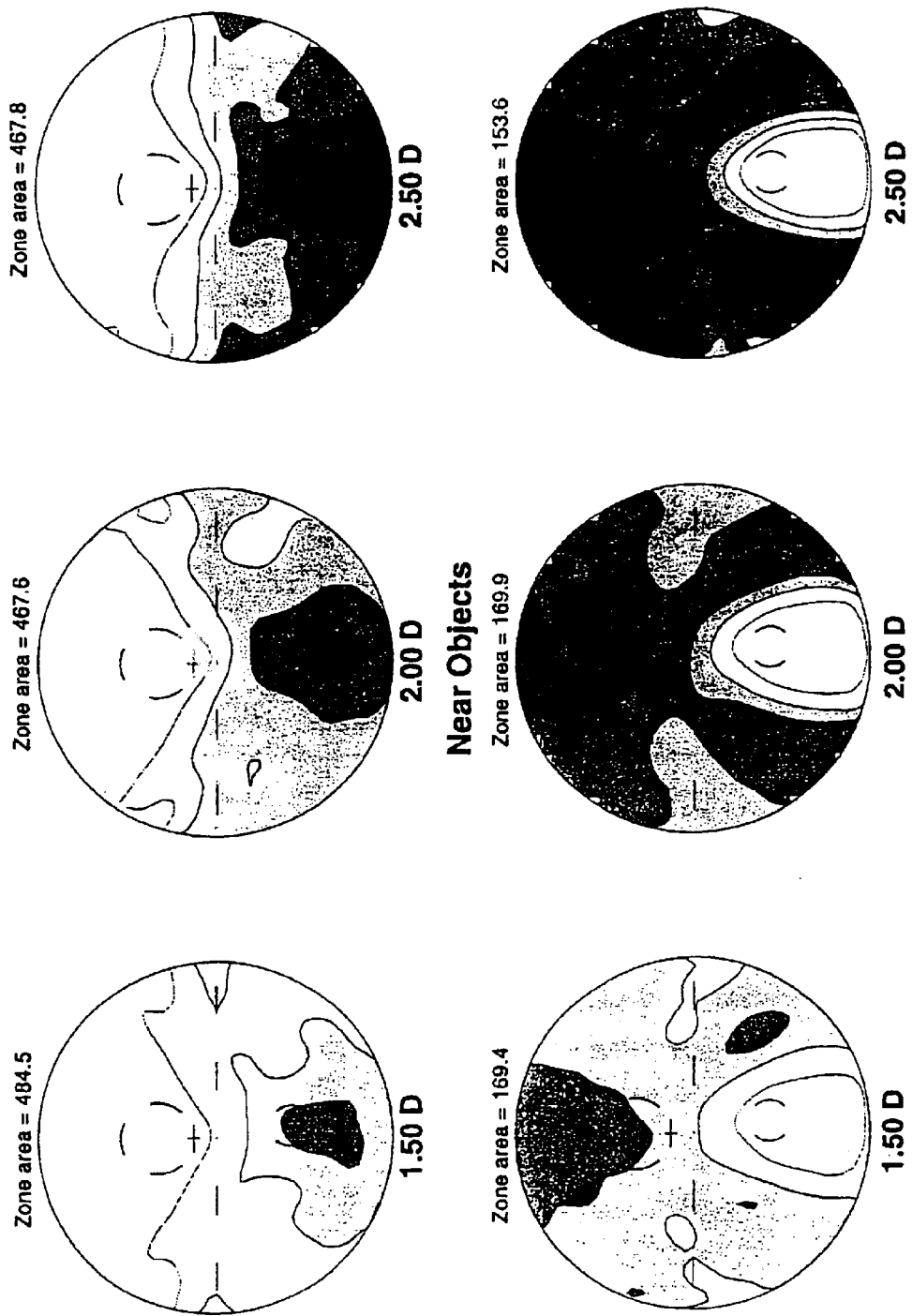

FIGS. 4a and b illustrate RMS power error contour plots ray traced for distance objects (object distance of infinity) and near objects (object distance of 0.40 m), respectively for a selection of optical lens elements from the series illustrated in FIG. 3. (Addition Powers 1.50 D. 2.00 D and 2.50 D). The wearer's distance prescription was assumed to be piano sphere. The areas of clear vision are defined by a limiting contour of RMS power error equivalent to Add/4 (in Diopters) inside a circle of 22 mm radius centred on a point 4 mm below the fitting cross, which will often coincide with the geometric centre of the lens. Zones are coloured pale grey, their size is indicated in $mm^2$.

Figure 5:
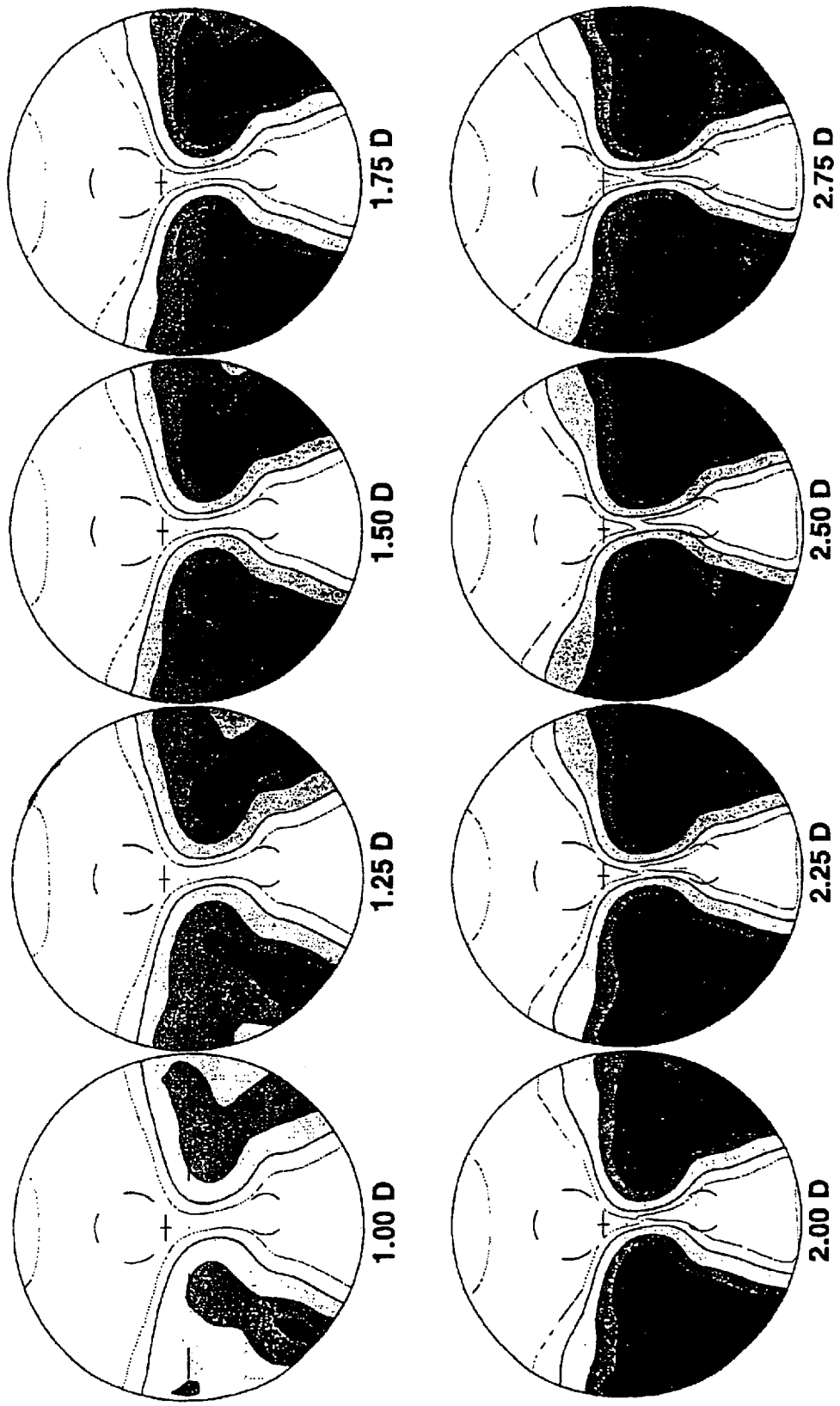

FIG. 5 illustrates contour plots of Surface Astigmatism of a series of optical lens elements according to the present invention, with a base curve of 2.75 D (intended for myopes) and having addition powers in the range of 1.00 D to 2.75 D.

Figure 6:
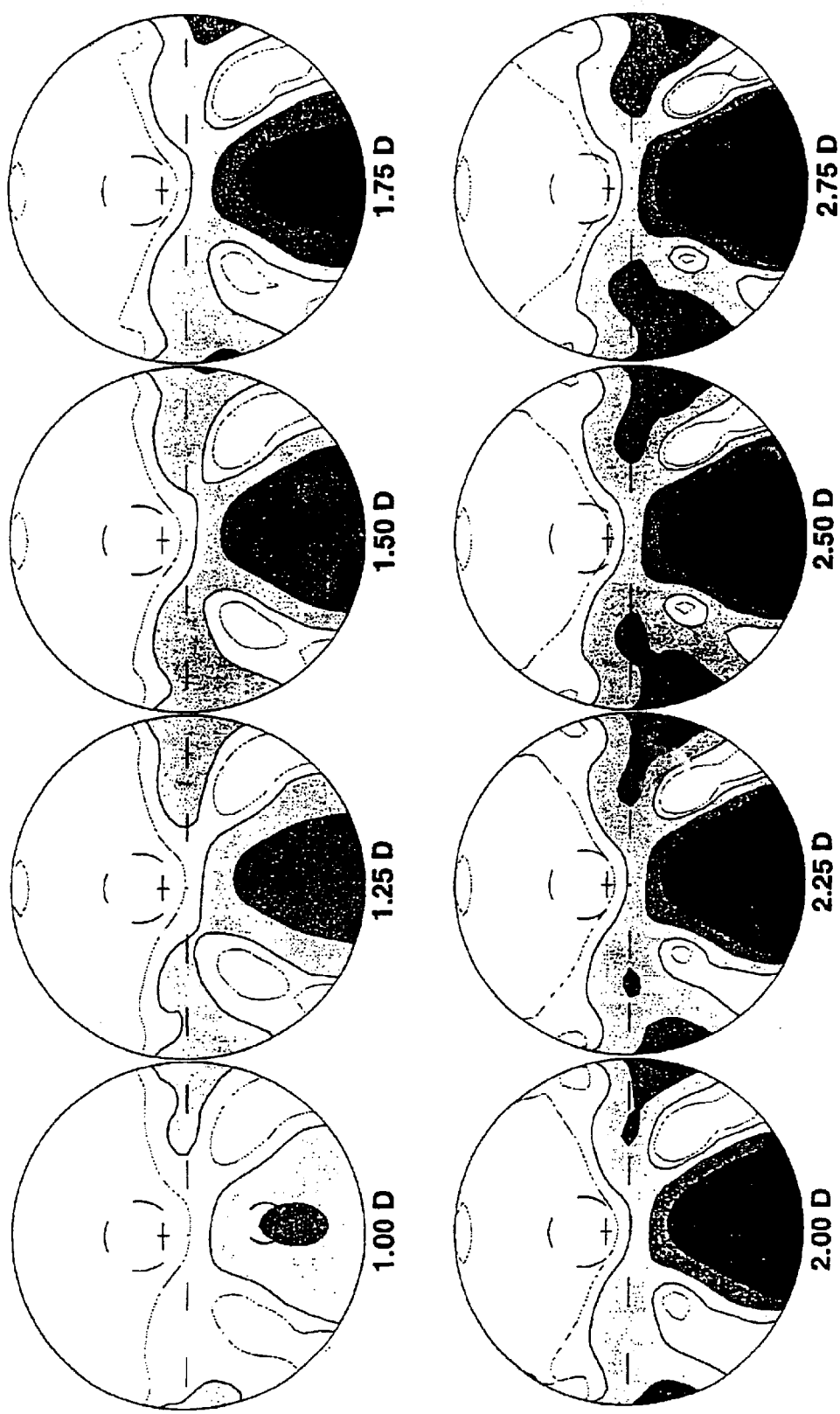

FIG. 6 illustrates contour plots of Surface Mean Power for the optical lens elements according to FIG. 5.

Figure 7:
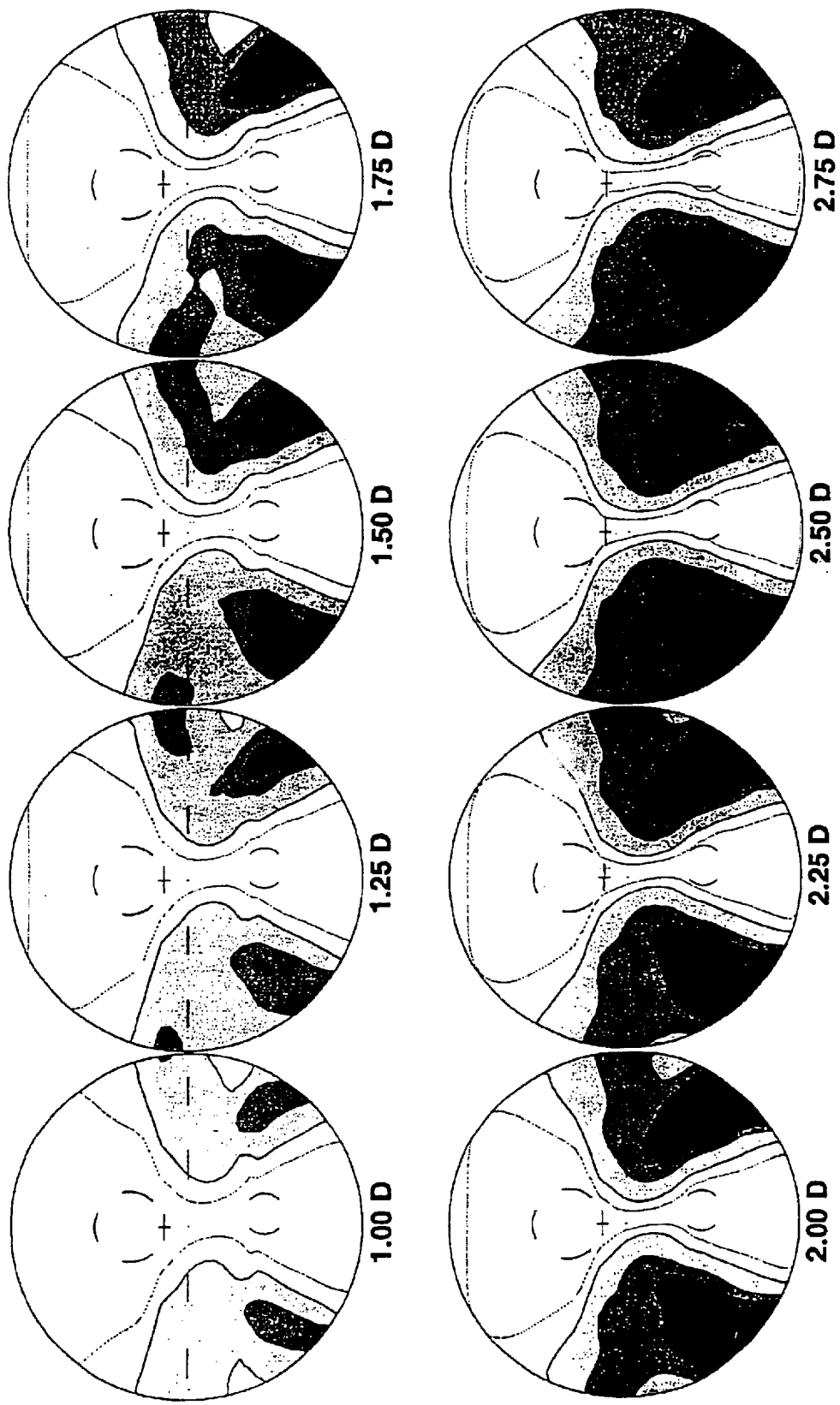

FIG. 7 illustrates contour plots of optical RMS Power Error for the optical lens elements according to FIGS. 5 and 6. Ray tracing has been carried out with the model lens in the material with refractive index of 1.537 having the front surface as shown in FIGS. 5 and 6 with the base curve of 2.75 D, a spherical back surface of 5.75 D, zero prism at the prism reference point and centre thickness of 2 mm; located in the front of the eye at a 27 mm back vertex distance from the centre of rotation of the eye and tilted pantoscopically by 7 degs. The assumed object field of the ray trace has a vertically varying distance starting at infinity (the dioptric distance of 0.00 D) for all rays crossing the front lens surface at elevations above the FC, through a linearly decreasing object distance below the FC up to the NMP, where the object distance was 0.4 m (2.5 D) for all adds up to 2.50 D, and staying constant along each ray at 0.4 m for elevations below the NMP. In the case of the 2.75 D add the near object distance was slightly shorter −0.36 m (2.75 D). In calculating the mean power error of the ray traced image as perceived by the wearer it has been assumed that the wearer has up to (2.5—Add) D of reserve accommodation enabling him/her to cancel the negative mean power errors up to that magnitude in the lower part of the lens.

Figure 8:
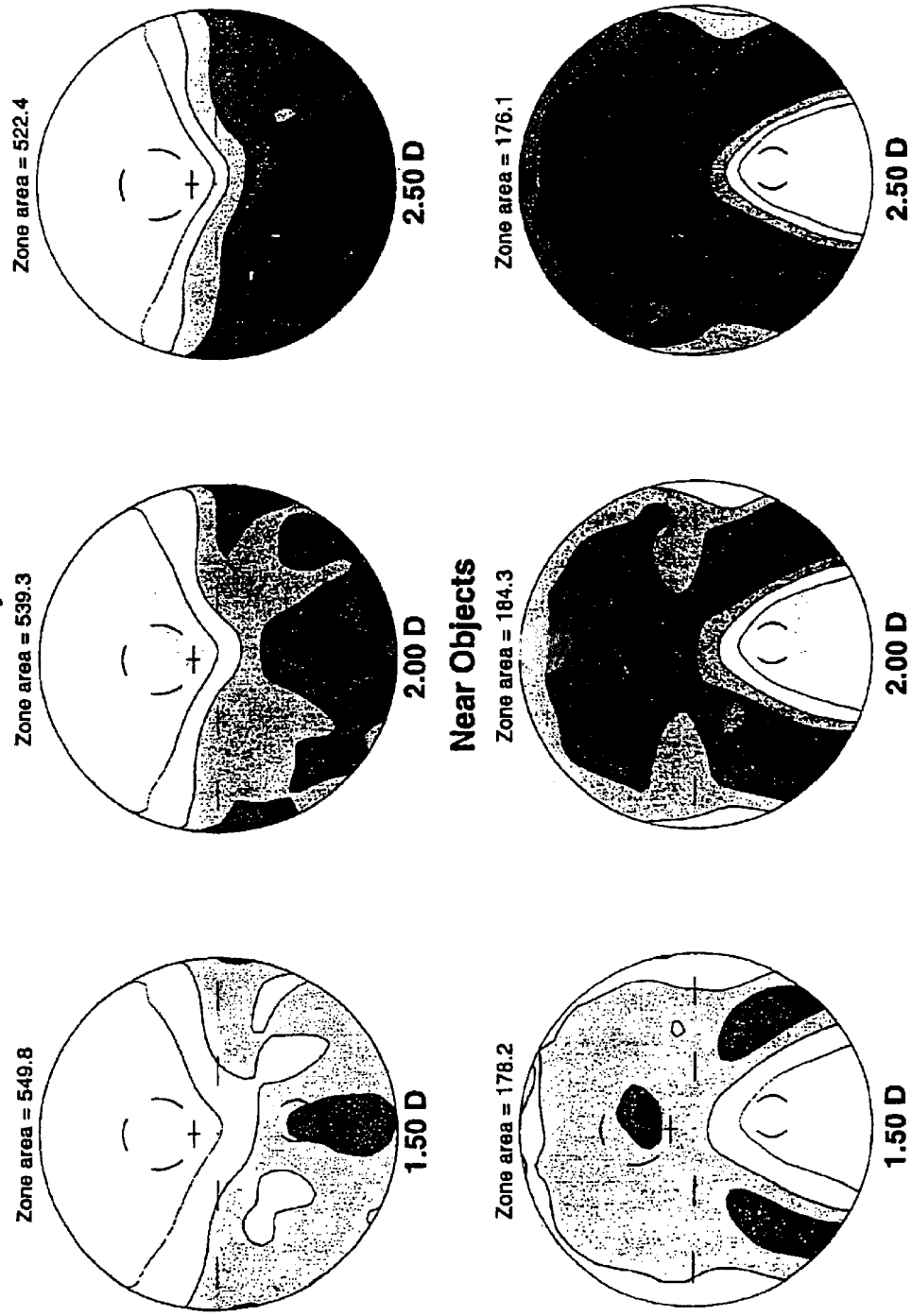

FIG. 8 illustrates RMS power error contour plots ray traced for distance objects (object distance of Infinity) and near objects (object distance of 0.40 m), for a selection of optical lens elements from the series illustrated in FIG. 7. (Addition Powers 1.50 D, 2.00 D and 2.60 D). The wearers distance prescription was assumed to be −3.00 D sphere. The areas of clear vision are defined by a limiting contour of RMS power error equivalent to Add/4 (in diopters) inside a circle of 22 mm radius centred on a point 4 mm below the fitting cross, which will often coincide with the geometric centre of the lens. Zones are coloured pate grey, their size Is indicated in $mm^2$.

Figure 9:
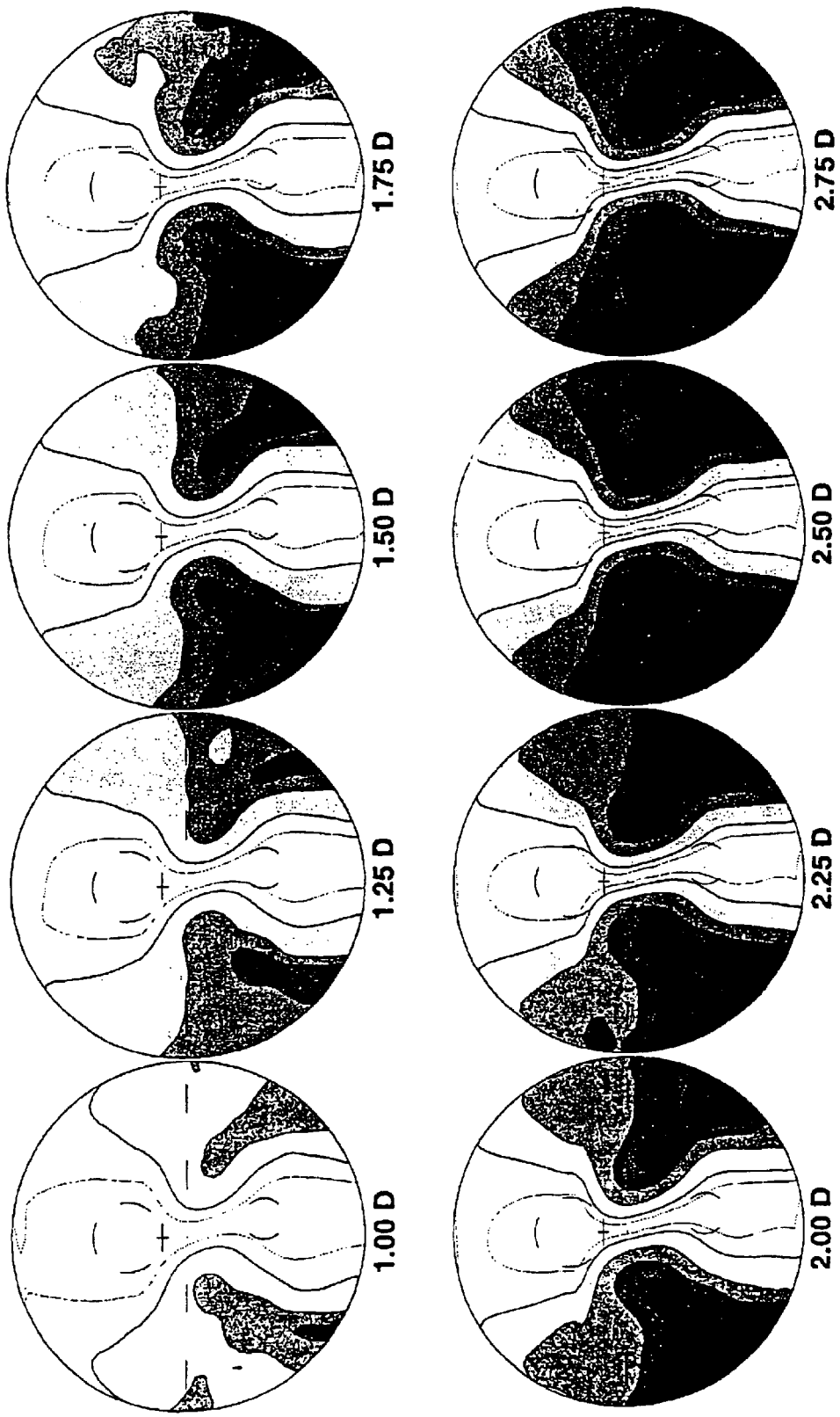

FIG. 9 illustrates contour plots of Surface Astigmatism of a series of optical lens elements according to the present invention, with a base curve of 6.50 D (intended for hyperopes) and having addition powers in the range of 1.00 D to 2.75 D.

Figure 10:
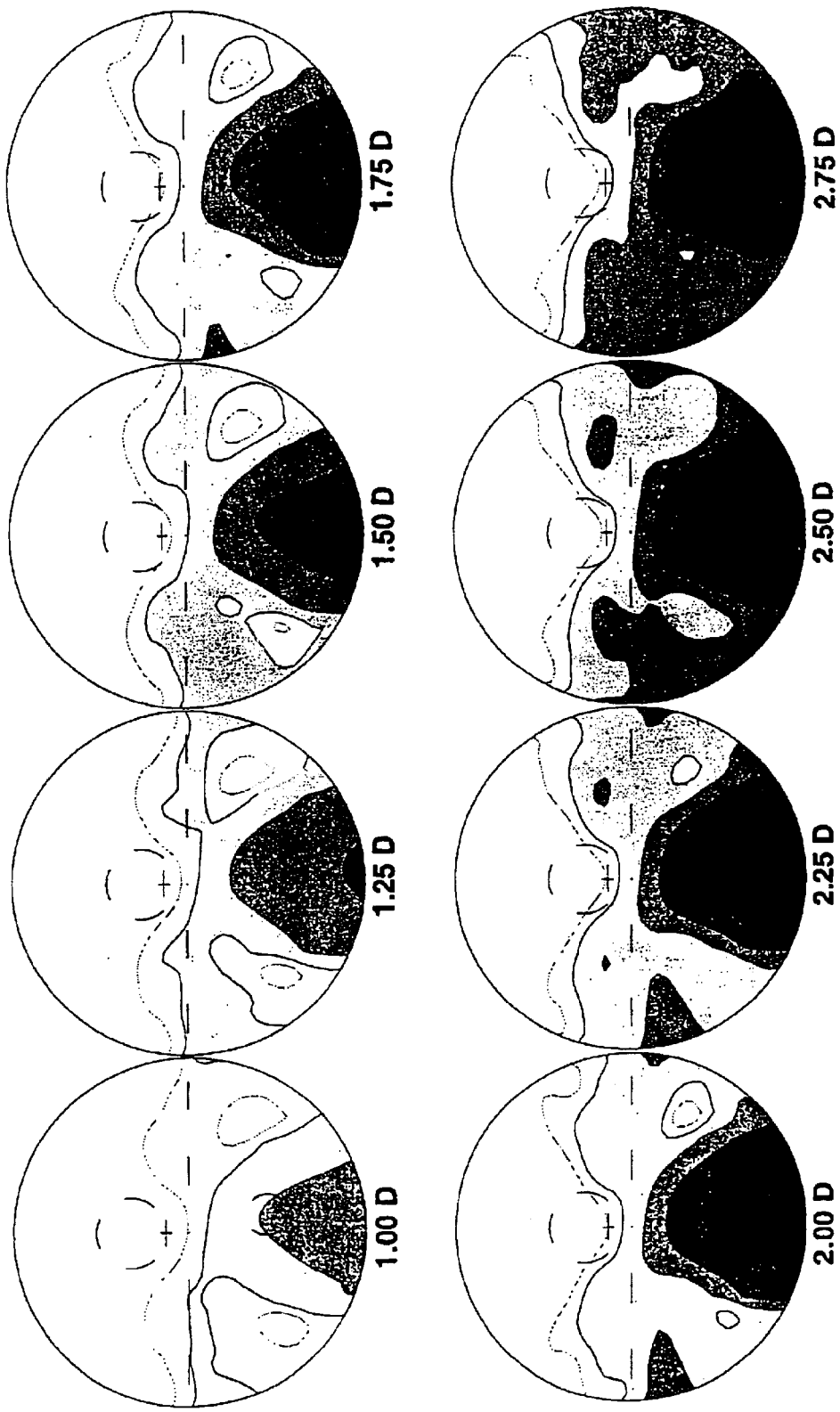

FIG. 10 illustrates contour plots of Surface Mean Power for the optical lens elements according to FIG. 9.

Figure 11:
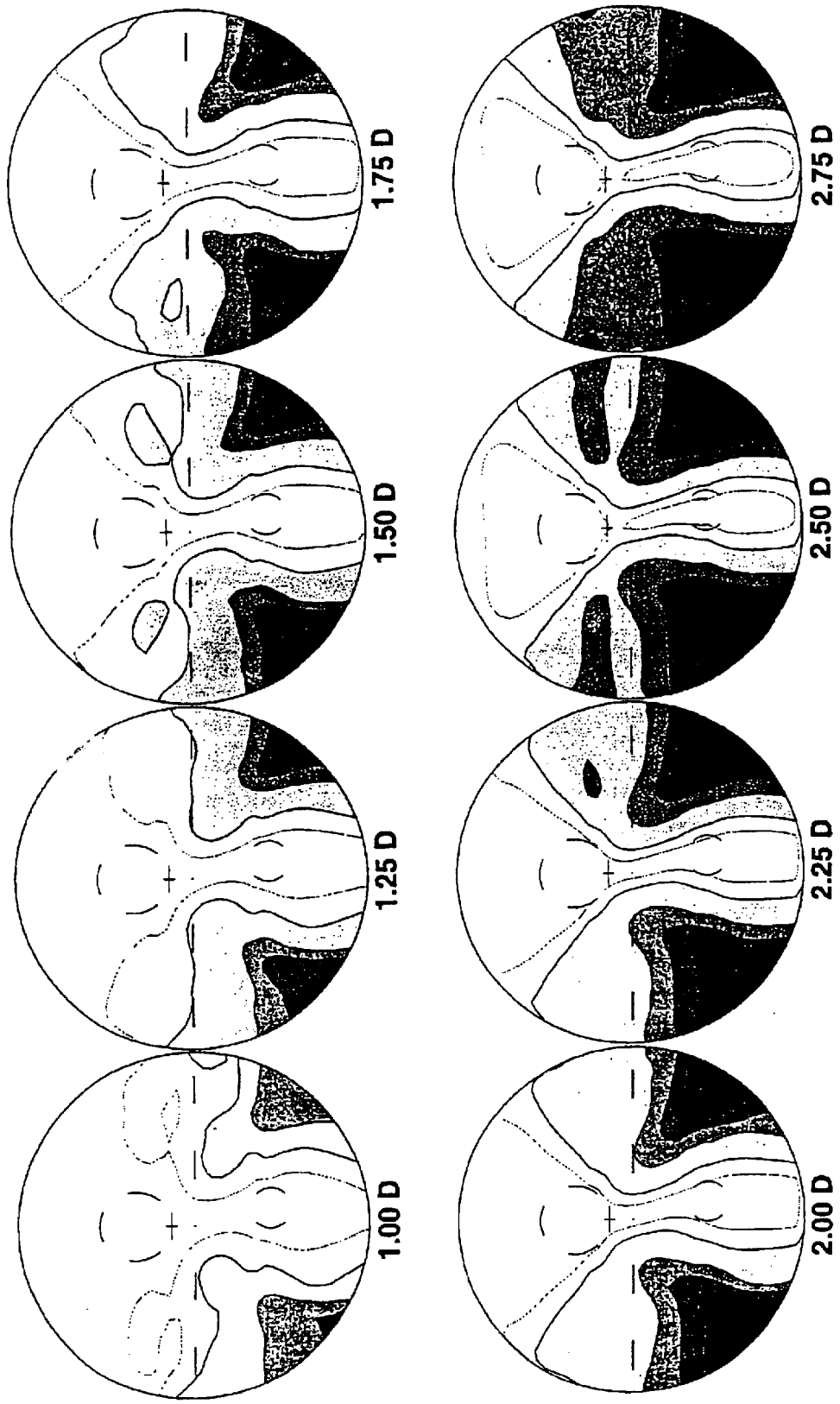

FIG. 11 illustrates contour plots of optical RMS Power Error for the optical lens elements according to FIGS. 9 and 10. Ray tracing has been carried out with the model lens in the material with refractive index of 1.537 having the front surface as shown in FIGS. 9 and 10 with the base curve of 6.50 D, a spherical back surface of 3.65 D, zero prism at the prism reference point and centre thickness of 4 mm; located in the front of the eye at a 27 mm back vertex distance from the centre of rotation of the eye and tilted pantoscopically by 7 degs. The assumed object field of the ray trace has a vertically varying distance starting at infinity (the dioptric distance of 0.00 D) for all rays crossing the front lens surface at elevations above the FC, through a linearly decreasing object distance below the FC up to the NMP, where the object distance was 0.4 m (2.5 D) for all adds up to 2.50 D, and staying constant along each ray at 0.4 m for elevations below the NMP. In the case of the 2.75 D add the near object distance was slightly shorter−0.36 m (2.75 D). In calculating the mean power error of the ray traced image as perceived by the wearer it has been assumed that the wearer has up to (2.5—Add) D of reserve accommodation enabling him/her to cancel the negative mean power errors up to that magnitude in the, lower part of the lens.

FIG. 12 Illustrates RMS power error contour plots ray traced for distance objects (object distance of infinity) and near objects (object distance of 0.40 m), for a selection of optical lens elements from the series illustrated in FIG. 11. (Addition Powers 1.50 D, 2.00 D and 2.50 D). The wearer's distance prescription was assumed to be +3.00 D sphere. The areas of clear vision are defined by a limiting contour of RMS power error equivalent to Add/4 (in diopters) inside a circle of 22 mm radius centred on a point 4 mm below the fitting cross, which will often coincide with the geometric centre of the lens. Zones are coloured pale grey, their size is indicated in $mm^2$, It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

What is claimed is:

1. A progressive ophthalmic lens element including a lens surface having an upper viewing zone having a surface power corresponding to distance vision, a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the lens surface including a relatively high relatively wide lower viewing zone; and a relatively wide intermediate zone wherein the upper viewing zone and lower viewing zone are such that the ratio of the area of clear vision of the upper viewing zone to the lower viewing zone is less than approximately 3.00 and greater than approximately 2.50.

2. A progressive ophthalmic lens according to claim 1 wherein the area of the lower viewing zone inside a 22 mm radius circle centred on the geometric centre and constrained by the Add/4 diopters RMS power error contour for a 0.4 m reading distance, is greater than approximately 150 mm$^2$, and the height of the lower viewing zone defined by the Add/$^4$ diopters RMS power error contour is in the range of approximately 10 to 12 mm below the fitting cross.

3. A progressive ophthalmic lens element according to claim 1, further including a surface correction(s) in the peripheral regions of the lens element which functions to reduce or minimise optical aberrations contributing to the phenomenon of swim.

4. A progressive ophthalmic lens element according to claim 3, wherein the surface correction(s) function to reduce optical aberrations in lens surface areas including a pair of generally horizontally disposed opposed sectors approximately ±22.50° above and below a generally horizontal axis passing through the fitting cross of the lens element.

5. A progressive ophthalmic lens element according to claim 4, wherein the opposed sectors have a radius of approximately 15 mm from the fitting cross.

6. A progressive ophthalmic lens element according to claim 4, wherein the opposed sectors have a radius of approximately 20 mm from the fitting cross.

7. A progressive ophthalmic lens element according to claim 3, wherein the surface correction(s) provides a reduction in variation of the sagittal addition power within the opposed sectors.

8. A progressive ophthalmic lens element according to claim 7, wherein the surface correction(s) is such that the difference between maximum and minimum sagittal addition power is less than approximately 0.75* Add diopters.

9. A progressive ophthalmic lens element according to claim 1, wherein the lens design exhibits a small amount of addition power proximate the fitting cross, depending on the nominal addition power of the lens element.

10. A progressive ophthalmic lens element according to claim 9, wherein the lens design exhibits approximately 0.05 D to 0.4 D of addition power proximate the fitting cross, depending on the nominal addition power of the lens element.

11. A progressive ophthalmic lens element according to claim 1, further including a surface correction to improve optical properties proximate the peripheries of the lens element.

12. A progressive ophthalmic lens element according to claim 11, wherein the distribution of RMS power error is varied proximate the peripheries of the upper and/or lower viewing zones to improve peripheral vision.

13. A progressive ophthalmic lens element series according to claim 12, wherein the distribution of RMS power error exhibits a relatively low gradient proximate the distance periphery and a relatively high gradient proximate the near periphery.

14. A progressive ophthalmic lens element according to claim 13, wherein the ratio of the maximum rate of change of the ray traced RMS power error along the 12 mm long vertical lines centred on the fitting cross (FC) and horizontally offset 15 mm from the FC to the maximum horizontal rate of change of the RMS power error at the level of the near vision measurement point (NMP) varies from approximately 0.4 to approximately 0.6.

15. A series of progressive ophthalmic lens elements, each lens element including a lens surface having an upper viewing zone having a surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the progressive ophthalmic lens series including lens elements having a base curve suitable for use in providing a range of distance prescriptions for one or more of emmetropes, hyperopes and myopes, each lens element differing in prescribed addition power and including a progressive design including a relatively high, relatively wide lower viewing zone and a relatively wide intermediate zone;

wherein the upper viewing zone and lower viewing zone are such that the ratio of the area of clear vision of the upper viewing zone to the lower viewing zone is less than approximately 3 and greater than approximately 2 ½ and wherein the dimensions of the intermediate and lower viewing zones are related to the prescribed addition power of the wearer.

16. A progressive ophthalmic lens element series according to claim 15, wherein each lens element in the series has a progressive lens design exhibiting a small amount of addition power proximate the fitting cross, dependent on the prescribed addition power and the base curve.

17. A progressive ophthalmic lens series according to claim 16, wherein the addition power proximate the fitting cross of a progressive lens element is in the range from 0.05 to 0.40 D, the fitting cross addition power increasing with the addition power for each of the base curves, and with the increasing base curve for each addition power.

18. A progressive ophthalmic lens element series according to claim 16, wherein the lens element series exhibits a slight decrease in the area of the zone clear for distance vision on the lens surface inside a 22 mm radius circle centred on the GC and constrained by the Add/4 diopters RMS power error contour ray traced in the as worn configuration for an infinite object distance with increasing base curve.

19. A progressive ophthalmic lens element series according to claim 18, wherein the lens elements exhibit an increase in corridor length within increasing addition power.

20. A progressive ophthalmic lens element series according to claim 19, wherein for low to medium addition powers the lens elements exhibit an increase in effective corridor length from approximately 10 to 12 mm; and for higher addition powers exhibit an effective corridor length of approximately 12 mm.

21. A progressive ophthalmic lens element series according to claim 15, wherein the progressive lens design of each lens element in the series includes a surface correction(s) in the peripheral regions of the lens element to reduce or minimise the phenomenon of swim.

22. A progressive ophthalmic lens element series according to claim 21, wherein the surface correction(s) function to reduce optical aberrations in lens surface areas including a pair of generally horizontally disposed opposed sectors approximately ±22.50° above and below a generally horizontal axis passing through the fitting cross.

23. A progressive ophthalmic lens element series according to claim 22, wherein the opposed sectors have a radius of approximately 15 mm or more.

24. A progressive ophthalmic lens element series according to claim 23, wherein the surface correction takes the form of a reduction in the sagittal addition power variations within each of the opposed sectors.

25. A progressive ophthalmic lens element series according to claim 24, wherein the difference between maximum and minimum sagittal addition power within each of the opposed sectors is less than approximately 0.75*Add diopters.

26. A progressive ophthalmic lens element series according to claim 15, wherein each element within the series exhibits a substantially constant area of clear vision on the lens surface within the lower viewing zone.

27. A progressive ophthalmic lens element series according to claim 15, wherein each lens element includes a surface correction to improve optical properties proximate the peripheries of the lens element.

28. A progressive ophthalmic lens element series according to claim 27, wherein the distribution of RMS power error is varied proximate the peripheries of the upper and/or lower viewing zones to improve peripheral vision.

29. A progressive ophthalmic lens element series according to claim 28, wherein the distribution of RMS power error exhibits a relatively low gradient proximate the distance periphery and a relatively high gradient proximate the near periphery.

30. A progressive ophthalmic lens element series according to claim 29, wherein the base elements have the ratio of the maximum rate of change of the ray traced RMS power error along the 12 mm long vertical lines centred on the fitting cross (FC) and horizontally offset 15 mm from the FC to the maximum horizontal rate of change of the RMS power error at the level of the near vision measurement point (NMP) varies from approximately 0.4 to approximately 0.6.

31. A method of designing an ophthalmic lens element including a first lens surface having an upper viewing zone having a surface power corresponding to distance vision, a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism; the ophthalmic lens element including a relatively high, relatively wide lower viewing zone; and a relatively wide intermediate zone, which method includes selecting a merit function relating to at least one optical characteristic of the lens to be minimised with an appropriate distribution of the optimisation weights on the lens surface; and solving the global minimisation problem using the Finite Element Method; and fabricating an ophthalmic lens element having a lens surface shaped according to said optimised surface description.

* * * * *

UNITED STATES PATENT AND TRADEMARK OFFICE
CERTIFICATE OF CORRECTION

PATENT NO. : 6,793,340 B1
DATED : September 21, 2004
INVENTOR(S) : Michael Alan Morris et al.

It is certified that error appears in the above-identified patent and that said Letters Patent is hereby corrected as shown below:

<u>Title page,</u>
Item [57], ABSTRACT,
Line 8, delete "a generally horizonally axis" and insert -- a generally horizonal axis --; and
Line 9, delete "Two or more progress" and insert -- Two or more progressive --.

Signed and Sealed this

Fifth Day of April, 2005

JON W. DUDAS
*Director of the United States Patent and Trademark Office*